(12) United States Patent
Ruckstuhl

(10) Patent No.: US 7,673,560 B2
(45) Date of Patent: Mar. 9, 2010

(54) BREWING APPARATUS FOR A COFFEE MACHINE

(75) Inventor: Stephan Ruckstuhl, Neuendorf (CH)

(73) Assignee: Eldom Rothrist AG, Rothrist (CH)

( * ) Notice: Subject to any disclaimer, the term of this patent is extended or adjusted under 35 U.S.C. 154(b) by 1049 days.

(21) Appl. No.: 11/352,878

(22) Filed: Feb. 13, 2006

(65) Prior Publication Data

US 2007/0186783 A1    Aug. 16, 2007

(51) Int. Cl.
*A47J 31/00*    (2006.01)
(52) U.S. Cl. .................... 99/302 P; 99/302 R; 99/289 R
(58) Field of Classification Search ............... 99/302 R, 99/302 P, 289 R, 287, 295
See application file for complete search history.

(56) References Cited

U.S. PATENT DOCUMENTS

| | | | | |
|---|---|---|---|---|
| 4,796,521 A | * | 1/1989 | Grossi | .......................... 99/287 |
| 5,146,839 A | * | 9/1992 | Gockelmann et al. | ......... 99/287 |
| 5,302,407 A | | 4/1994 | Vetterli | |
| 6,035,762 A | | 3/2000 | Ruckstuhl | |
| 6,182,554 B1 | * | 2/2001 | Beaulieu et al. | ........... 99/289 R |
| 6,634,280 B2 | * | 10/2003 | Sowden et al. | ............. 99/302 P |
| 6,711,988 B1 | * | 3/2004 | Eugster | ....................... 99/299 |
| 7,270,050 B2 | * | 9/2007 | Glucksman et al. | ........... 99/297 |

FOREIGN PATENT DOCUMENTS

| | | |
|---|---|---|
| CH | 668543 | 1/1989 |
| EP | 1 625 813 B1 | 2/2006 |
| GB | 971767 | 10/1964 |

\* cited by examiner

*Primary Examiner*—Reginald L Alexander
(74) *Attorney, Agent, or Firm*—Sughrue Mion, PLLC

(57) ABSTRACT

A brewing apparatus for a coffee machine, in particular for domestic use, comprises a housing (10) which encloses a brewing chamber (19) and has a nozzle assembly (8, 9, 11) arranged on one side and a base (12) with an outflow (40) for the brewed fluid arranged on an opposite side, a sealing element (20) being provided between the nozzle assembly (8, 9, 11) and housing (10). According to the invention, the sealing element (20) is retained on the nozzle assembly (8, 9, 11) such that it can be moved in the direction of the housing (10) and of the brewing chamber (19). Sealing can thus take place straightforwardly and, in addition, it is possible to configure the volume of the brewing chamber (19) in a variable manner via the sealing element (20).

12 Claims, 4 Drawing Sheets

BREWING APPARATUS FOR A COFFEE MACHINE

FIELD OF THE INVENTION

The present invention relates to a brewing apparatus for a coffee machine, in particular for domestic us, having a housing which encloses a brewing chamber and has a nozzle assembly arranged on one side and a base with an outflow for the brewed fluid arranged on an opposite side, a sealing element being provided between the nozzle assembly and housing.

BACKGROUND OF THE INVENTION

There are coffee machines which contain a brewing apparatus into which one or more portion packs with coffee can be introduced. For this purpose, the brewing chamber has a holder which can be removed from the coffee machine in order for a corresponding portion pack to be introduced. The portion pack is then introduced into the brewing apparatus and a cover, which seals a brewing chamber via a sealing ring, is closed. The disadvantage with this type of sealing is that the sealing ring is subject to a relatively high level of wear and, in addition, a contact pressure of the sealing ring is only achieved via the mechanical means of the housing. After a period of time, leakages may thus occur and the sealing ring has to be exchanged. Furthermore, such a design only allows a relatively high pressure to build up in the brewing chamber to a limited extent. Finally, there is also the disadvantage that, during the coffee-brewing operation, the coffee powder collapses to some extent and the fluid introduced into the brewing chamber can thus flow past the portion pack through gaps formed (bypass effect) without any extraction taking place.

SUMMARY OF THE INVENTION

One of the preferred objects of the present invention is thus to provide a brewing apparatus for a coffee machine which ensures reliable sealing and allows a certain amount of volume adaptation of the brewing chamber This object is e.g. achieved by a brewing apparatus which has the features as describes herein.

According to one aspect of the invention, the sealing element is retained on the nozzle assembly such that it can be moved in the direction of the housing and of the brewing chamber. The brewing chamber can thus be sealed in a straightforward manner since the requirements which have to be met by the dimensional accuracy of the positioning of the housing relative to the nozzle assembly can be kept to a low level. Certain tolerance deviations can be compensated for by the movement of the sealing element, which then, when moving in relation to the housing, can form an all-round sealing surface. It is thus also possible for the housing to be removed from the sealing element and the nozzle assembly in a straightforward manner, and without a large amount of force being applied, in order to empty or to fill the brewing chamber. Furthermore, a certain amount of volume equalization can take place by means of the sealing element and a corresponding pressure-exerting element if the extraction substance collapses slightly in the brewing chamber during the brewing operation, since the sealing element can reduce the volume of the brewing chamber via the movement in relation to the brewing chamber. This avoids the above-described bypass effect as a result of the formation of gaps.

According to a preferred embodiment of the invention, the sealing element can be positioned against the housing for sealing purposes by way of an outer sealing surface and can be moved in relation to the brewing chamber by way of an inner part. It is thus possible for the sealing element to be designed in the form of a ring or circle, or else in any other desired form, and to have an outer, relatively fixed section which ensures sealing with the housing, it being possible to achieve volume equalization by way of an inner section, as a result of elasticity. For this purpose, the sealing element can preferably be subjected to pressure on the side which is directed away from the brewing chamber, with the result that there is no need for any drive for moving the sealing element.

Since a brewing apparatus usually has a pump provided for supplying the fluid, the movement of the sealing element preferably takes place hydraulically, and there is a connection with a relief valve between a supply line for the nozzle assembly and a pressure chamber for the sealing element. The pressure produced by the pump can thus be utilized in order to move the sealing element onto the housing or in the direction of the brewing chamber. Sealing of the housing with high contact pressure of the seal then takes place only if required for the brewing operation, and the movement of the sealing element otherwise is also restricted to the brewing operation. Outside the brewing operation, the relief valve remains open and the seal is not subjected to pressure. During the brewing operation, however, the supply line to the nozzle assembly is closed by a prestressed valve, with the result that, in the first instance, a pressure is built up in a pressure chamber for the sealing element in order that the latter is positioned with sealing action against the housing and moves in the direction of the brewing chamber. It is only when a certain pressure is exceeded that the valve is then opened and the fluid can flow into the brewing chamber, it being the case, at this point in time, that sealing is already ensured by the sealing element and the extraction substance can be compressed slightly by the sealing element.

In order for the extraction substance to be compressed as uniformly as possible within the brewing chamber, it is possible to arrange or form on the sealing element a pressure-exerting element which, during the brewing operation, moves in relation to, or into, the brewing chamber. The pressure-exerting element may have the same cross-sectional shape as the brewing chamber, in order to allow uniform surface pressure. It is possible here for the pressure-exerting element, if formed separately, to be aligned on the sealing element via one or more pins.

According to a further configuration of the brewing apparatus, the brewing chamber can accommodate one or more portion packs with coffee which are retained with a contact pressure between the base with the outflow and the pressure-exerting element. For a defined pressure within the brewing chamber, the outflow may be provided with a prestressed shut-off valve which opens only when a certain pressure is exceeded.

The nozzle assembly may comprise a fixed nozzle through which a fluid flows into the brewing chamber. The supply of fluid may thus be provided for straightforwardly in design terms, the nozzle being enclosed by the flexible sealing element.

BRIEF DESCRIPTION OF THE DRAWINGS

The invention is explained in more detail hereinbelow by way of an exemplary embodiment (which shall not be construed to limit the scope of the invention as defined in the appended claims) and with reference to the attached drawings, in which:

DESCRIPTION OF EXAMPLE EMBODIMENTS

Figure 1:
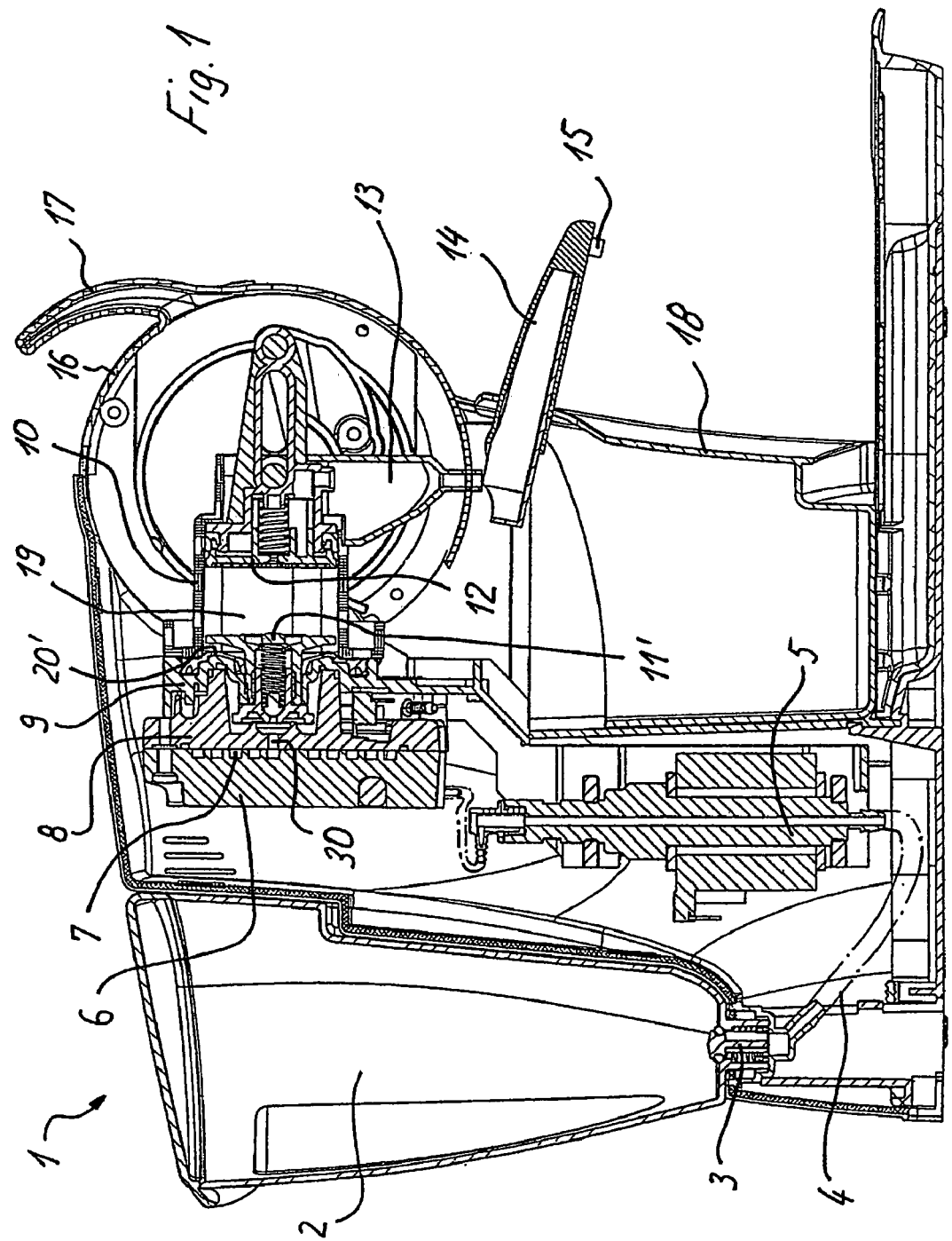
FIG. 1 shows a sectional side view of a coffee machine with a brewing apparatus according to the invention.

A coffee machine 1 comprises a storage container 2 for clean water, the storage container having provided on it an outlet valve 3 which is connected to a pump 5 via a line 4. By means of the pump 5, the water can be led to a heating plate 6 which contains helical through-passages 7 in which the water can be heated. Provided alongside this is a plate 8 which forms part of a nozzle assembly and in which is provided a supply line 30 for the heated water. Installed on the plate 8 is a mount 9 for a sealing element 20 which is of essentially annular design and has a nozzle 11 provided in its center. Via the nozzle 11, the heated water can flow into a brewing chamber 19 which is enclosed by a housing 10. Provided on the opposite side of the nozzle 11 is a base 12 which is intended for bounding the brewing chamber 19 and which contains an outflow, with the result that the fluid brewed flows through a funnel-like outlet 13 to an extension arm 14, on which an outlet opening 15 is provided for the purpose of filling coffee cups.

The coffee machine 1 comprises a brewing chamber 19 in which it is possible to insert one or more portion packs with coffee. Provided for this purpose is a cylindrical covering 16 on which is formed a handle 17, via which the housing 10 can be released from the nozzle assembly and pivoted via an actuating mechanism, with the result that the brewing chamber 19 is filled from above. The covering 16 is then closed and the housing 10 is moved into the position shown. Following the brewing operation, the portion packs are then emptied into a collecting container 18 in order for the brewing chamber 19 to be filled anew. For the present application, however, it is possible to use quite different actuating mechanisms for the purpose of filling the brewing apparatus with one or more portion packs.

Figure 2:
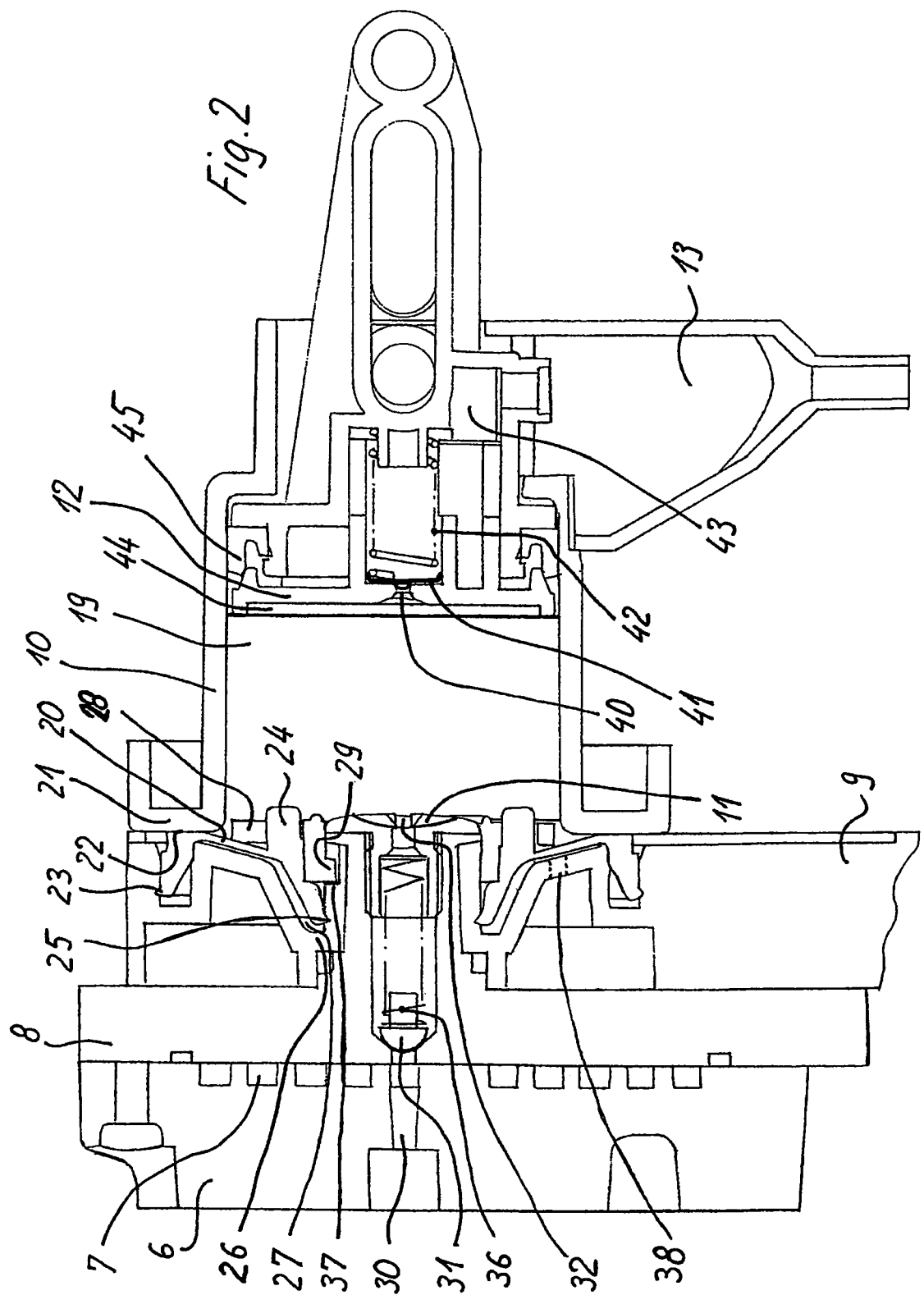
FIG. 2 shows a sectional detail-specific view of the brewing apparatus from FIG. 1.

FIG. 2 illustrates the brewing apparatus of the coffee machine 1 on an enlarged scale, the nozzle assembly 11 and the sealing element 20 being modified slightly in relation to FIG. 1. The sealing element 20 is of annular design and has an outer section on which are formed sealing lips 22 which butt against a radially outwardly projecting flange 21 of the housing 10. Also formed on the outer section of the seal 20 is a sealing surface 23 which ensures sealing between the holder 9 and the seal 20. Provided on an inner section of the seal 20 is a further sealing lip 25 for forming a sealing surface which butts against an annular section 26 of the holder 9. The holder 9 here is provided with an annular wall which is designed in a manner similar to the geometry of the seal 20. A pressure chamber 27 is thus formed between the wall of the holder 9 and the seal 20, and this pressure chamber is bounded by the sealing surface 23 on the outside and by the sealing surface 25 on the inside and can be subjected to pressure via a supply line 38. The supply line 38 is connected to the supply line 30 for supplying the heated water into the brewing chamber 19.

Arranged on that side of the sealing element 20 which 30 is directed toward the brewing chamber 19 is a plate-like pressure-exerting element 28, which is aligned by two pins 24 formed on the sealing element 20. The pressure-exerting element 28 has an inner cutout, in which the fixed nozzle 11 is accommodated. The pressure-exerting element 28 here has a protrusion 29 which can be moved maximally between the nozzle 11 and a stop 37 on the holder 9. The pressure-exerting element 28 is arranged in a displaceable manner in this region and can be moved correspondingly into the brewing chamber 19.

Once the fluid has been heated, it can flow through a supply line 30 which is closed by a prestressed valve 31. For this purpose, a spring 36 is arranged between the valve body 31 and the nozzle 11. The nozzle 11 is screw-connected to a sleeve-like protrusion of the plate 8 and has an opening 32 which opens out into the brewing chamber 19.

On the opposite side of the nozzle 11, a base 12 is provided on the brewing chamber 19, this base having a plurality of ribs 44 and a central outflow 40. The outflow 40 is closed via a valve body 41, which is prestressed into the closed position via a spring 42. This ensures that, within the brewing chamber 19, the fluid can be led away via an outflow channel 43 only when a certain pressure is exceeded.

Figure 3:
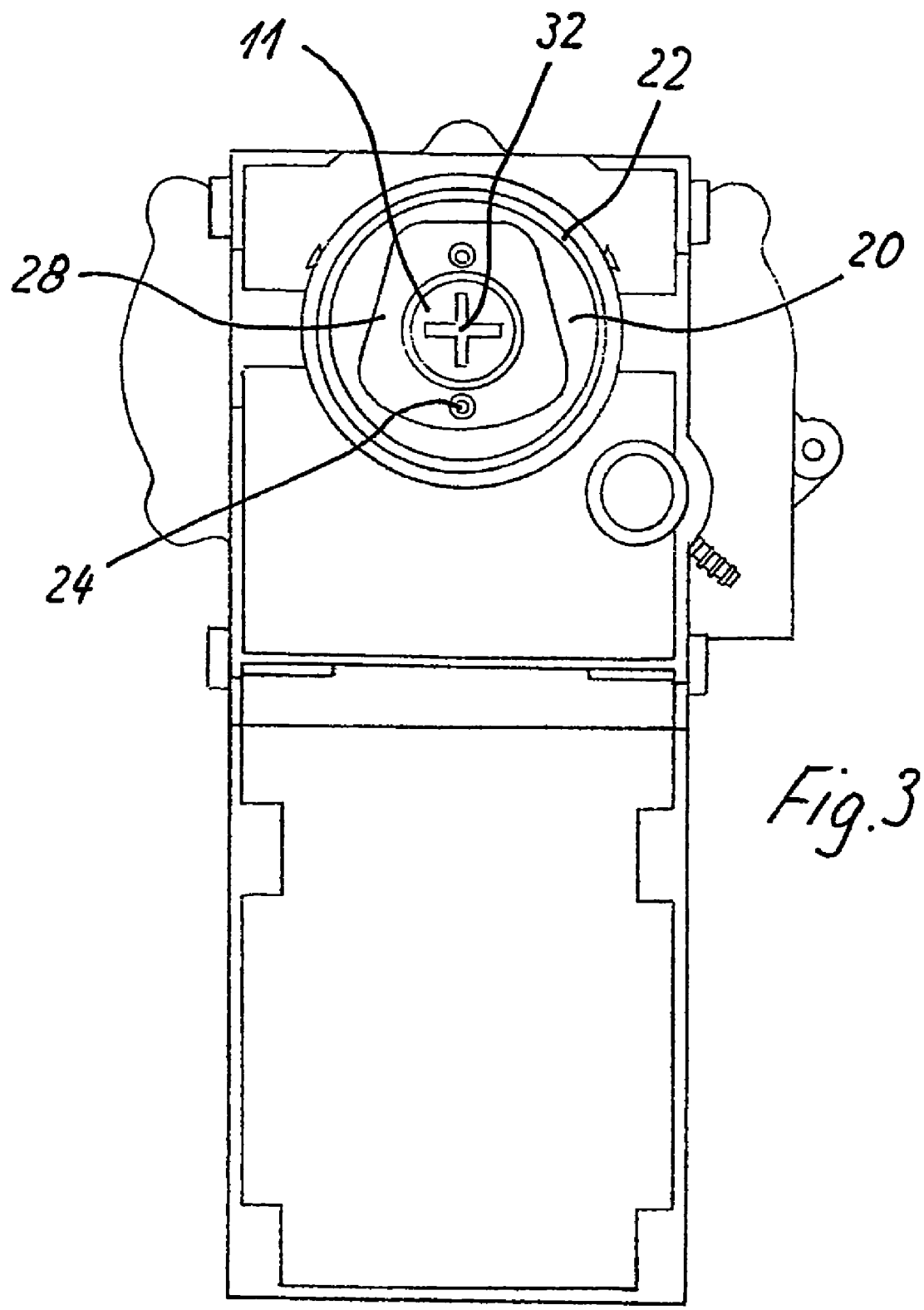
FIG. 3 shows a plan view of the nozzle assembly of the brewing chamber from FIG. 2.

FIG. 3 shows the nozzle 11 in plan view, from which the cross-shaped outlet opening 32 is visible. The nozzle 11 is accommodated within the pressure-exerting element 28, which is retained in a centered manner via pins 24. The pressure-exerting element 28 is of a shape which corresponds to the cross section of the brewing chamber 19. The sealing lips 22 are of circular design and butt against the housing 10.

Figure 4:
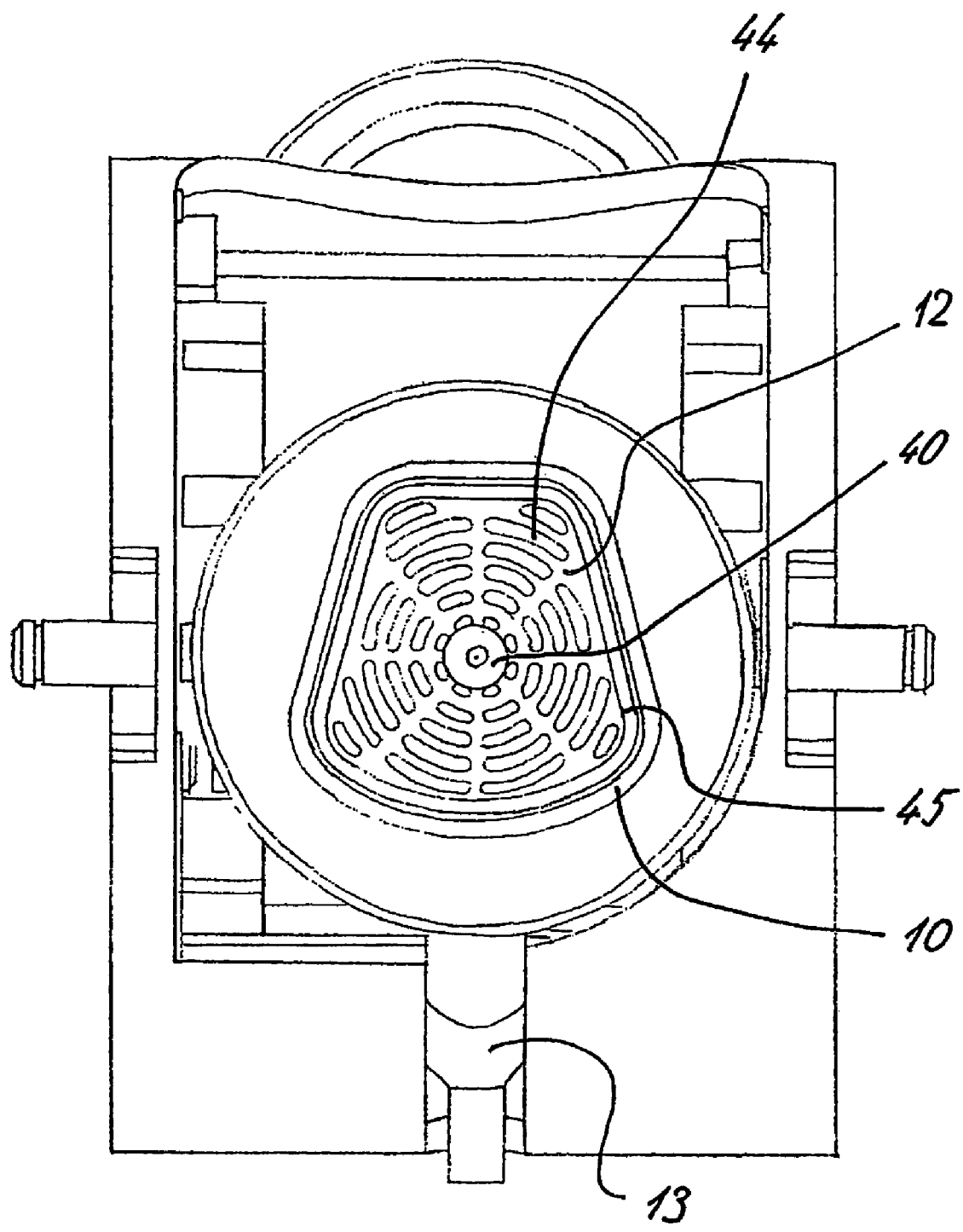
FIG. 4 shows a plan view of the base of the brewing chamber from FIG. 2.

FIG. 4 illustrates the base 12 of the brewing chamber 19. The ribs 44 ensure a spacing between the portion packs within the brewing chamber 19 and a base surface, with the result that the fluid can be led to the outflow 40. The base 44 is sealed on the periphery via a seal 45.

For the purpose of brewing coffee, once the brewing chamber 19 has been filled with one or more portion packs, the pump 5 is actuated, as a result of which the fluid is pumped through the helical channels 7 and, via the closed relief valve, a pressure builds up within the pressure chamber 27 and ensures that the sealing element 20 moves in relation to the housing 10 and the brewing chamber 19. Consequently, first of all, the sealing lips 22 are forced against the flange 21 of the housing 10 and, in the central region, the pressure-exerting element 28 is forced against the portion packs. Once a certain pressure has been exceeded, the valve 31 opens and the heated fluid can then flow into the brewing chamber 19 via the nozzle 11. If the coffee powder collapses slightly during the brewing operation, the flexible seal 20 compensates for this since the sealing element 20 can easily be moved into the brewing chamber 19 together with the pressure-exerting element 28. This avoids gaps within the brewing chamber 19 which can result in a bypass of the heated water. Once the water has flowed through the coffee powder, the brewed coffee can flow out of the brewing chamber 19 via the outflow 40.

The exemplary embodiment which is illustrated in FIG. 2 has a plate-like pressure-exerting element 28 which is essentially in the form of the cross section of the brewing chamber 19. It is also possible, in an alternative embodiment, for the sealing element 20, instead of the pressure-exerting element 28, to be forced directly against the portion packs.

FIG. 1, furthermore, shows a modified embodiment in which the nozzle 11' is designed to be moveable and can be forced into the brewing chamber 19 via the seal 20'. The nozzle 11' thus performs the function of the pressure-exerting element 28 and of the nozzle 11, it thus being possible to do away with the pressure-exerting element 28. The volume of the pressure chamber 27 is slightly increased in this configuration.

As an alternative, it is also possible to integrate the nozzle 11 in a diaphragm seal which is secured on the periphery. The nozzle 11 here may be retained on an opening of the diaphragm seal in a sealed manner via known clamping connections. It is also possible in this way to achieve the desired movement of the sealing element during the brewing operation.

It is also possible to separate the movement of the sealing element 20 fully from the supply of water for the brewing operation. It would also be possible for the sealing element to be subjected, for movement purposes, to the action of cold water or some other fluid.

What is claimed is:

1. A brewing apparatus for a coffee machine, in particular for domestic use, having a housing (10) which encloses a brewing chamber (19) and has a nozzle assembly (8, 9, 11) arranged on one side and a base (12) with an outflow (40) for the brewed fluid arranged on an opposite side, a sealing element (20) being provided between the nozzle assembly (8, 9, 11) and housing (10), the sealing element (20) being retained on the nozzle assembly (8, 9, 11) such that it can be moved in the direction of the housing (10) and of the brewing chamber (19), wherein the sealing element (20) has an outer section on which are formed sealing lips (22) which butt against a radially outwardly projecting flange (21) of the housing, and wherein the sealing element (20) has an inner section on which a further sealing lip (25) is provided for forming a sealing surface which butts against an annular section (26) of a holder (9) for the sealing element (20).

2. The brewing apparatus as claimed in claim 1, wherein the sealing element (20) can be positioned against the housing (10) for sealing purposes by way of an outer sealing surface (22) and can be moved in relation to the brewing chamber (19) by way of an inner part.

3. The brewing apparatus as claimed in claim 1, wherein the sealing element (20) can be subjected to pressure on the side which is directed away from the brewing chamber (19).

4. The brewing apparatus as claimed in claim 1, wherein the movement of the sealing element (20) takes place hydraulically, and there is a connection between a supply line (30) for the nozzle assembly (8, 9, 11) and a pressure chamber (27) for the sealing element (20).

5. The brewing apparatus as claimed in claim 4, wherein a supply line (30) for the nozzle assembly (8, 9, 11) is closed by a prestressed valve (31).

6. The brewing apparatus as claimed in claim 1, wherein arranged or formed on the sealing element (20) is a pressure-exerting element (28) which, during the brewing operation, is retained with a contact pressure against an extraction substance arranged in the brewing chamber (19).

7. The brewing apparatus as claimed in claim 1, wherein the brewing chamber (19) can accommodate one or more portion packs with coffee which are retained with a contact pressure between the base (12) with the outflow (40) and a pressure-exerting element (28) which is arranged on the opposite side.

8. The brewing apparatus as claimed in claim 1, wherein a fixed nozzle (11) is installed within the sealing element (20) through which a fluid flows into the brewing chamber (19).

9. The brewing apparatus as claimed in claim 1, wherein at least one pin (24) for aligning the pressure-exerting element (28) is integrally formed on the sealing element (20).

10. The brewing apparatus as claimed in claim 1, wherein a prestressed shut-off valve (41) is provided on the outflow (40) of the brewing chamber (19).

11. The brewing apparatus as claimed in claim 1, wherein the sealing element (20) has a contour which is adapted to beverage portion packs and the cross section of the brewing chamber (19).

12. The brewing apparatus as claimed in claim 1, wherein a fluid guide for the brewing operation and a fluid guide for moving the sealing element (20) are separate from one another.

* * * * *